US010285436B2

(12) United States Patent
Branton

(10) Patent No.: US 10,285,436 B2
(45) Date of Patent: May 14, 2019

(54) ADSORBENT MATERIALS

(71) Applicant: British American Tobacco (Investments) Limited, London (GB)

(72) Inventor: Peter Branton, London (GB)

(73) Assignee: BRITISH AMERICAN TOBACCO (INVESTMENTS) LIMITED, London (GB)

( * ) Notice: Subject to any disclaimer, the term of this patent is extended or adjusted under 35 U.S.C. 154(b) by 290 days.

(21) Appl. No.: 15/037,911

(22) PCT Filed: Nov. 20, 2014

(86) PCT No.: PCT/GB2014/053431
§ 371 (c)(1),
(2) Date: May 19, 2016

(87) PCT Pub. No.: WO2015/075452
PCT Pub. Date: May 28, 2015

(65) Prior Publication Data
US 2016/0286855 A1    Oct. 6, 2016

(30) Foreign Application Priority Data

Nov. 22, 2013 (GB) .................................. 1320674.3

(51) Int. Cl.
| | |
|---|---|
| *B01J 20/20* | (2006.01) |
| *A24D 3/06* | (2006.01) |
| *A24D 3/16* | (2006.01) |
| *B01J 20/30* | (2006.01) |
| *B01J 20/28* | (2006.01) |
| *A24D 3/02* | (2006.01) |
| *A24D 3/04* | (2006.01) |
| *B01J 20/32* | (2006.01) |

(52) U.S. Cl.
CPC .......... *A24D 3/062* (2013.01); *A24D 3/0287* (2013.01); *A24D 3/048* (2013.01); *A24D 3/061* (2013.01); *A24D 3/067* (2013.01); *A24D 3/16* (2013.01); *A24D 3/163* (2013.01); *A24D 3/166* (2013.01); *B01J 20/20* (2013.01); *B01J 20/2808* (2013.01); *B01J 20/28019* (2013.01); *B01J 20/28083* (2013.01); *B01J 20/3085* (2013.01); *B01J 20/3204* (2013.01)

(58) Field of Classification Search
CPC ...... B01J 20/20; B01J 20/28019; A24D 3/062

USPC ......................................................... 502/400
See application file for complete search history.

(56) References Cited

U.S. PATENT DOCUMENTS

| | | | |
|---|---|---|---|
| 3,972,335 A | 8/1976 | Tiggelbeck | |
| 2002/0166563 A1 | 11/2002 | Jupe | |
| 2003/0159703 A1 | 8/2003 | Yang | |
| 2004/0231684 A1 | 11/2004 | Zawadzki | |
| 2006/0130861 A1* | 6/2006 | Luan ................... | A24B 15/283 131/335 |
| 2006/0272662 A1 | 12/2006 | Jupe | |
| 2007/0000505 A1 | 1/2007 | Zhuang | |
| 2007/0204869 A1 | 9/2007 | Sampson | |
| 2008/0107589 A1 | 5/2008 | Von Blucher | |
| 2012/0172216 A1 | 7/2012 | Bohringer | |

FOREIGN PATENT DOCUMENTS

| | | |
|---|---|---|
| EP | 1918022 A1 | 5/2008 |
| GB | 2013045944 A2 | 4/2013 |
| WO | 2005115182 A2 | 12/2005 |
| WO | 2012053251 A1 | 4/2012 |
| WO | 2012168699 A1 | 12/2012 |
| WO | 2012172292 A1 | 12/2012 |
| WO | 20130113312 A1 | 1/2013 |

OTHER PUBLICATIONS

International Preliminary Report of Patentability for corresponding application PCT/GB2014/053431 filed Nov. 20 2014; dated Mar. 4, 2016.
International Search Report for corresponding application PCT/GB2014/053431 filed Nov. 20, 2014; dated Mar. 2, 2015.
Written Opinion for corresponding application PCT/GB2014/053431 filed Nov. 20, 2014; dated Mar. 2, 2015.
Michele Mola, "The characterization and evaluation of activated carbon in a cigarette filter", Adsorption (2008) 14: 335-341.

* cited by examiner

*Primary Examiner* — Edward M Johnson
(74) *Attorney, Agent, or Firm* — Cantor Colburn LLP

(57) ABSTRACT

There is provided an adsorbent material comprising a porous carrier material having pores with a diameter greater than 20 nm and carrying additive particles on its external surface, wherein the additive particles comprise an additive and have a diameter of greater than 20 nm. There is also provided a smoking article filter element comprising such an adsorbent material, a smoking article comprising such an adsorbent material, and a method of preparing such an adsorbent material.

14 Claims, 4 Drawing Sheets

ADSORBENT MATERIALS

FIELD

The present invention relates to adsorbent materials and particularly to adsorbent material which includes a porous carrier and an additive material. Particularly, but not exclusively, the adsorbent material has adsorbent properties rendering it suitable for use in smoke filtration.

BACKGROUND

Filtration is used to reduce certain particulates and/or vapour phase constituents of gases, including, for example, tobacco smoke drawn through a smoking article and inhaled during smoking. Filters may include adsorbent materials to adsorb certain constituents of gases, typically by physisorption.

SUMMARY

In accordance with a first aspect of the invention, there is provided an adsorbent material comprising a porous carrier material having pores with a diameter less than 20 nm and carrying additive particles on its external surface, wherein the additive particles comprise an additive and have a diameter of greater than 20 nm.

In some embodiments, the additive particles cover at least about 10% of the external surface of the porous carrier material.

In some embodiments, the porous carrier material comprises an activated carbon, silica, zeolite, sepiolite and/or a clay material.

In some embodiments, at least about 10% of the pores of the porous carrier material are available to adsorb compounds from the vapour phase.

In some embodiments, the additive is a volatile material.

In some embodiments, the additive is a flavour and/or aroma. In some embodiments, the flavour and/or aroma is a plant compound or derivative thereof, such as sandalwood, eucalyptus, anise, or cedar.

In some embodiments, the additive particles comprise a material for stabilising and/or storing the additive before the additive is released as a vapour.

In accordance with a second aspect of the present invention, a smoking article filter element is provided, comprising an adsorbent material according to the first aspect of the invention.

In accordance with a third aspect of the present invention, a smoking article is provided comprising an adsorbent material according the first aspect, or a smoking article filter element according to the second aspect of the invention.

In accordance with a fourth aspect of the present invention, a method of preparing an adsorbent material according to the first aspect of the invention is provided, the method comprising providing a porous carrier material having pores with a diameter less than 20 nm, and depositing additive particles having a diameter of greater than 20 nm onto the external surface of the porous carrier material.

In some embodiments, the additive particles are deposited onto the external surface of the porous carrier material from the solid and/or liquid phase of an aerosol.

In some embodiments, the additive particles are deposited onto the external surface of the porous carrier material inside a closed chamber.

BRIEF DESCRIPTION OF DRAWINGS

Embodiments of the invention will now be described, by way of example only, with reference to accompanying drawings, in which.

DETAILED DESCRIPTION

The present invention relates to an adsorbent material. In particular, the present invention relates to an adsorbent material which is suitable for inclusion in a smoking article.

In some embodiments, the adsorbent material is capable of removing at least some of the constituents from a vapour, such as from tobacco smoke which passes over the adsorbent material. In addition, the adsorbent material acts as a carrier for an additive which may be released.

Thus, in some embodiments, the adsorbent material of the invention may simultaneously act as an effective source of one or more additives via the deposited particles it carries, and as an effective adsorbent for one or more other compounds from the vapour phase via its pores with a diameter less than 20 nm.

The porous carrier material is selected to provide the adsorbent properties. In addition, the porous carrier material has an external surface to which the additive particles are attached. In the present specification, the "external surface" of the porous adsorbent material refers to the surface of the porous material which is not located within a pore.

The porous carrier material may adsorb compounds by physisorption and/or chemisorption. A porous carrier material that adsorbs compounds by chemisorption is likely to be more selective for the compounds it adsorbs compared to a porous carrier material that adsorbs compounds by physisorption. In some embodiments, the adsorbent material of the invention may comprise a porous carrier material that adsorbs compounds by physisorption so that it is non-selective for the compounds it adsorbs. In some embodiments, the adsorbent material of the invention may comprise a porous carrier material that adsorbs compounds by chemisorption so that it is selective for the compounds it adsorbs.

The adsorbent properties of the porous carrier material are not dependent upon the additive first being released from its surface. Rather, as soon as the adsorbent material is incorporated into a smoking article it has exposed pores which provide it with adsorbent activity. In some embodiments, as the additive is released over time, this adsorbent activity may increase, as more pores become available. However, the porous carrier material has adsorbent properties before any additive has been released.

Figure 1:
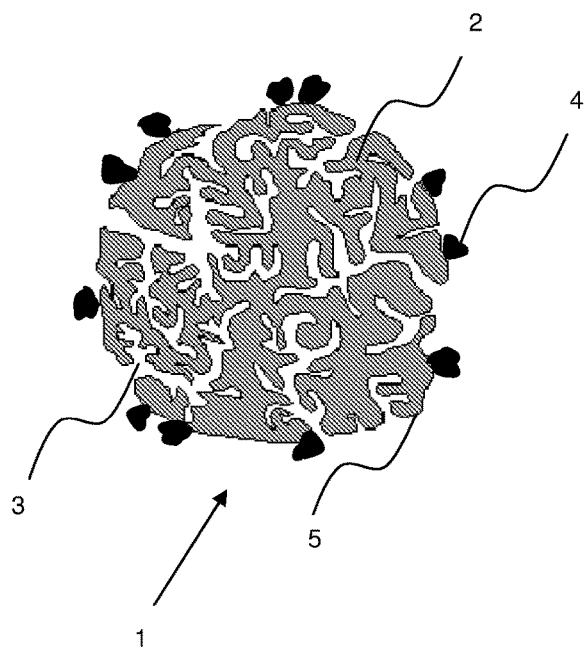
FIG. 1 is a schematic illustration of the adsorbent material according to one embodiment of the invention (not drawn to scale).

Referring to FIG. 1, for the purpose of illustration and not limitation, an adsorbent material 1 according to an exemplary embodiment of the present invention comprises a porous carrier material 2 with a plurality of pores 3. These pores 3 are too small for the additive particles 4 to occupy, and so the additive particles 4 only attach to the external surface 5 of the porous carrier material 2 because they cannot access its internal pore structure. The pores 3 may therefore remain free to adsorb compounds from the vapour phase. In some embodiments, these compounds may be constituents of tobacco smoke.

In some embodiments, the additive particles do not saturate the pores with a diameter less than 20 nm, so that the porous carrier has available or exposed pores which are capable of adsorption. In some embodiments, the pores of the porous carrier material comprise micropores and/or mesopores. This may be advantageous because mesopores and, in particular, micropores are of a size which is particularly effective for the adsorption of compounds from the vapour phase of tobacco smoke. In some embodiments, the porous carrier material may comprise pores with a diameter less than or equal to 2 nm because such pores can be particularly effective for the adsorption of certain compounds from the vapour phase of tobacco smoke.

The porous carrier material of the invention has pores with a diameter less than 20 nm because the particles from an aerosol source (mainstream tobacco smoke being an example) very rarely have a diameter less than 20 nm, thereby minimising the extent to which these particles can enter, and possibly block or saturate, the pores of the porous carrier material. As a result, the pores of the porous carrier material retain a larger surface area for adsorbing compounds from the vapour phase of tobacco smoke, and the porous carrier material may act as a more effective adsorbent material with a greater adsorption capacity.

In order to assist deposition of the additive particles on sites other than in the pores with a diameter less than 20 nm of the porous carrier material, the additive particles have a diameter greater than 20 nm, meaning that they are too large to occupy these pores of the porous carrier material. In addition, in some embodiments, the extent to which the deposited additive particles reduce the adsorbent properties of the carrier material is controlled by limiting the number of additive particles deposited.

In some embodiments, the additive particles may be deposited onto the porous carrier material without the porous carrier material having been exposed to any pore-modifying agents. In this context, a "pore-modifying agent" is an agent that is added to the pores of a porous carrier material in order to modify the adsorbent properties of the pores. In some cases, a pore modifying agent may be added to inhibit the ability of the pores to adsorb one or more compounds. In some cases, a pore modifying agent may be added to inhibit the ability of the more strongly adsorbing pores to adsorb one or more compounds.

The additive particles on the external surface of the porous carrier material act as the source of one or more additives and, in embodiments wherein the particles act as the source of more than one additive, individual particles may act as the source of more than one additive and/or different particles may act as the source of different additives. The one or more additives provided by the particles may be provided by the particles for any suitable purpose or purposes. In some embodiments, the one or more additives may be added to tobacco smoke during smoking.

In some embodiments, the additive particles on the external surface of the porous carrier material may have any suitable composition, and the composition of the additive particles may be substantially the same for different particles and/or may differ between particles. In some embodiments, two or more distinct types of particle with distinct compositions may be applied to the external surface of the adsorbent material and, in these embodiments, each type of particle may serve a different function, such as providing a different aroma and/or flavour.

In some embodiments, the additive particles may comprise one or more additives together with one or more other compounds. In some of these embodiments, the one or more additives may be released from the particles as a gas or vapour. Thus, for example, the additive may be a volatile compound. Alternatively, the additive may be a compound which is readily volatilised, for example, under conditions created upon use of the adsorbent material. In some embodiments, the one or more other compounds may stabilise and/or store the one or more additives before their release. In some embodiments, the additive particles may comprise one additive for release as a vapour and one compound for stabilising and/or storing the additive before its release as a vapour. In some embodiments, the timing and/or extent of release of the additive may be controlled by the one or more other compounds. In some embodiments, the additive will be gradually released from the additive particles over time and this may occur in an uncontrolled manner.

In some embodiments, the additive particles remain attached to the external surface of the porous carrier material while the one or more additives held by the particles are released. In these embodiments, one or more additives may evaporate and/or sublime from the additive particles while one or more other compounds remain attached to the external surface of the porous carrier material.

In some of these embodiments, the one or more additives released from the additive particles may be volatile and/or semi-volatile compounds, thereby promoting their release, and subsequent dispersion. Furthermore, the one or more non-additive compounds which remain attached to the external surface of the porous carrier material may be non-volatile and/or less volatile compounds than the one or more additives released, thereby promoting their attachment to the external surface while the one or more additives are released.

The ability of the adsorbent material of the invention to act both as a source of additive and an adsorbent may be quantified by comparing the adsorption capacity of the porous carrier material in the absence of additive particles on its external surface with the adsorption capacity of the porous carrier material with additive particles on its external surface, i.e. adsorbent material in accordance with the invention. In some embodiments, it may be advantageous for the difference in adsorption capacity to be small. In some embodiments, the difference may be less than about 90%, 80%, 70%, 60%, 50%, 40%, 30%, 20%, 10%, 5%, 1%, or 0.1%. In some embodiments, the difference may be less than about 50%.

Since carrying additive particles on the external surface of the porous carrier material may reduce the adsorption capacity of the porous carrier material and therefore of the adsorbent material, it may be desirable to compensate for this by, for example, using more porous carrier material and/or adsorbent material, or by increasing or adjusting the porosity and/or surface area of the porous carrier material to enhance adsorption.

In some of these embodiments, the adsorption capacity of the adsorbent material may be increased by the same or similar percentage amount as the percentage difference between the adsorption capacity of the adsorbent material with additive particles and its porous carrier material without additive particles. For example, in embodiments wherein the adsorbent material of the invention has a 50% lower adsorption capacity than its porous carrier material, the mass of the adsorbent material used as an adsorbent may be 50% greater than the mass of its porous carrier material which would be used in the same application.

In some embodiments, the adsorbent materials are for inclusion in smoking articles to selectively adsorb certain constituents of tobacco smoke and/or to add one or more additives to the gaseous flow being drawn through the smoking article.

Smoking articles, and in particular, smoking article filters may include porous adsorbent materials to adsorb certain smoke constituents, namely certain particulates and/or vapour phase constituents of tobacco smoke, typically by physisorption.

As used herein, the term "smoking article" includes smokeable products such as cigarettes, cigars and cigarillos whether based on tobacco, tobacco derivatives, expanded tobacco, reconstituted tobacco or tobacco substitutes and also heat-not-burn products. The smoking article may be provided with a filter for the gaseous flow drawn by the smoker.

One example of a type of porous carrier material which may be used in the adsorbent material is activated carbon. Activated carbon materials have become widely used as versatile adsorbents owing to their large surface area and microporous structure. In particular, these materials are especially effective in the adsorption of organic and inorganic pollutants due to the high capacity of organic molecules to bind to carbon. Activated carbon is known to be effective in smoke filtration and it may be included in the filters of smoking articles.

The activated carbon material may comprise any suitable pore structure, provided it comprises pores with a diameter less than 20 nm, such as micropores and/or mesopores. In some embodiments, the activated carbon may have a pore structure which is the most effective pore structure for acting as a filter in its chosen application. For example, in some embodiments, the activated carbon may have a pore structure which is most effective for the filtration of tobacco smoke where the adsorbent material is intended for inclusion in a smoking article Furthermore, the activated carbon may have, and/or be modified to have, any suitable relative quantity and relative distribution of macropores, and/or mesopores, and/or micropores.

Activated carbons are commonly produced from organic carbonaceous starting materials including nut shells including coconut shells, husks, wood powder, peat, bone, coal tar, resins and related polymers. Coconut shell is particularly attractive as a raw material for the production of activated carbon because it is cheap and readily available, and is also environmentally sustainable. Furthermore, it is possible to produce from coconut shell activated carbon material which is highly pure and has a high surface area.

In embodiments wherein the activated carbon material is prepared from synthetic carbon-based material, the synthetic carbon-based material may be a polymer. In some embodiments, it may be advantageous for the carbon-based material to be polymer-based because it is easier to control the pore size and distribution, and thus filtration characteristics, of the resulting activated carbon.

In some embodiments, the activated carbon material may be a synthetic carbon-based material made by the polycondensation of an aldehyde and a phenol. In these embodiments, suitable aldehydes include but are not limited to: formaldehyde, glyoxal, glutaraldehyde, and furfural; and suitable phenols include but are not limited to: phenol, resorcinol, catechin, hydrochinon, and phloroglucinol. In some embodiments, the activated carbon material may be a synthetic carbon-based material made by the polycondensation of resorcinol and formaldehyde under alkaline conditions.

The performance and suitability of porous activated carbon material as an adsorbent in different environments is determined by various physical properties of the material, including the shape and size of the particles, the pore size, the surface area of the material, and so on. These various parameters may be controlled by manipulating the process and conditions by which the porous carbon is produced.

Activated carbon adsorbs compounds onto the surface of its pores by physisorption. Physisorption is a less selective form of adsorption than chemisorption. Therefore, activated carbon may be used to adsorb a large range of compounds. In some embodiments, it may be advantageous for the porous carrier material of the invention to comprise activated carbon for this reason. For example, in embodiments wherein the adsorbent material of the invention is used to filter tobacco smoke, it may be advantageous for the porous carrier material to comprise activated carbon so that it is able to adsorb a large range of compounds from the tobacco smoke.

Other porous carrier materials that may be used in the adsorbent material include silica, zeolite, sepiolite and other porous clays.

Generally, the larger the surface area of a porous material, the greater is the adsorption capacity of the material. However, as the surface area of the material is increased, the density and the structural integrity are reduced. Furthermore, while the surface area of a material may be increased by increasing the number of pores and making the pores smaller, as the size of the pores approaches the size of the target molecule, it is less likely that the target molecules will enter the pores and adsorb to the material. This is particularly true if the material being filtered has a high flow rate relative to the activated carbon material, as is the case in a smoking article.

The precise method used to manufacture porous carbon material has a strong influence on its properties. It is therefore possible to produce carbons having a wide range of shapes, sizes, size distributions, pore sizes, pore volumes, pore size distributions and surface areas, each of which influences their effectiveness as adsorbents. The attrition rate is also an important variable; low attrition rates are desirable to avoid the generation of dust during high speed filter manufacturing.

As explained in *Adsorption* (2008) 14: 335-341, conventional coconut carbon is essentially microporous, and increasing the carbon activation time results in an increase in the number of micropores and surface area but produces no real change in pore size or distribution.

In accordance with nomenclature used by those skilled in the art, pores in an adsorbent material that are less than 2 nm in diameter are called "micropores", and pores having diameters of between 2 nm and 50 nm are called "mesopores". Pores are referred to as "macropores" if their diameter exceeds 50 nm. Pores having diameters greater than 50 nm do not usually contribute significantly to the overall adsorption.

In some embodiments, the adsorbent material provided is suitable for inclusion in a smoking article. In some embodiments, the adsorbent material is included in order to selectively adsorb certain particulates and/or vapour phase constituents of tobacco smoke drawn through the smoking article upon smoking. To that end, the porous adsorbent material may be provided with micropores and/or mesopores.

The surface area of porous materials is estimated by measuring the variation of the volume of nitrogen adsorbed by the material in relation to the partial pressure of nitrogen at a constant temperature. Analysis of the results by mathematical models originated by Brunauer, Emmett and Teller results in a value known as the BET surface area.

In some embodiments, porous carrier materials with high BET surface areas may be preferred over porous carrier materials with low BET surfaces areas in the adsorbent materials of the invention. This is because porous carrier materials with high BET surface areas are likely to have greater adsorption capacities compared to porous carrier materials with low BET surface areas. In embodiments wherein the porous carrier material is activated carbon and for use in smoking articles, the higher the BET surface area of the activated carbon, the greater its capacity for adsorbing and therefore filtering compounds from tobacco smoke.

In some embodiments, adsorbent materials of the present invention with high BET surface areas may be preferred over adsorbent materials of the present invention with low BET surface areas. This is because adsorbent materials with high BET surface areas are likely to have greater adsorption capacities than adsorbent materials with low BET surface areas.

In some embodiments, it may be advantageous for the difference in the BET surface area of the adsorbent material of the invention and its constituent porous carrier material to be small. In some embodiments, the BET surface area of the adsorbent material of the invention is approximately the same as the BET surface area of its constituent porous carrier material.

In some embodiments, the porous carrier materials used in the present invention have a BET surface area, in the absence of additive particles on their surfaces, of at least 400, 450, 500, 550, 600, 650, 700, 750, 800, 900, 1000, 1100, 1200, 1300, 1400, 1500, 1600, 1700, 1800 or at least 1900 $m^2/g$. In the case of activated carbon, it may be advantageous for the materials to have a BET surface area of at least 800 $m^2/g$ since activated carbon with this BET surface area is known to be particularly effective for the filtration of tobacco smoke.

In some embodiments, the adsorbent materials used in the present invention, comprising a porous carrier material carrying additive particles on its external surfaces, may have a BET surface area of at least 200, 250, 300, 350, 400, 450, 500, 550, 600, 700, 800, 900, 1000, 1100, 1200, 1300, 1400, 1500, 1600 or at least 1800 $m^2/g$. In the case of activated carbon, it may be advantageous for the adsorbent materials to have a BET surface area of at least 800 $m^2/g$ since activated carbon with this BET surface area is known to be particularly effective for the filtration of tobacco smoke.

In some embodiments, the porous carrier materials of the invention, such as activated carbon, may have a pore volume (as estimated by nitrogen adsorption) of at least 0.3 $cm^3/g$ or of at least 0.5 $cm^3/g$ in the absence of additive particles on their surfaces. In some embodiments, the adsorbent materials of the invention, comprising a porous carrier material such as activated carbon carrying additive particles on its external surfaces, may have a pore volume (as estimated by nitrogen adsorption) of at least 0.3 $cm^3/g$ or of at least 0.5 $cm^3/g$. Porous carrier materials, such as activated carbon, with pore volumes of at least 0.5 $cm^3/g$ may be particularly useful as an adsorbent for tobacco smoke. Porous carrier materials with pore volumes significantly higher than 1 $cm^3/g$ are low in density and are therefore less easy to handle in cigarette production equipment. Such carbon materials may be less favourable for use in cigarettes or smoke filters for that reason.

The porous adsorbent material may be provided in monolithic or particulate form. In some embodiments, the adsorbent material is in the form of particles. In some embodiments, the adsorbent particles may have a particle size in the range of between 10 μm and 1500 μm. In some embodiments, the adsorbent particles may have a mean particle size between about 100 μm and about 1000 μm, between about 150 μm and about 800 μm, or between about 250 μm and about 750 μm.

The porous carrier material may have any suitable size and shape. In some embodiments, the porous carrier may be a monolith. In some embodiments, the porous carrier may be particulate, for example in the form of lumps and/or granules and/or powder. In some embodiments, particles of porous material may be bound together, for example by a binder, to form larger forms with a desired size, shape or other properties.

Porous carrier materials depend on their pores for their adsorption properties, and their capacity to adsorb decreases as their pores become occupied. Consequently, it is difficult to add materials or compounds to porous adsorbent materials without affecting their adsorption capacity.

Nevertheless, in addition to acting as an adsorbent, the porous carrier material further acts as a carrier for an additive. In order to minimise the blocking of pores and the attendant reduction in adsorbency of the porous material, the additive is carried on the external surface of the porous adsorbent material, rather than being located within the internal structure.

The additive particles are selected to be larger than the pores of the adsorbent material so that the particles do not adsorb onto and occupy the pores, as this would prevent such occupied pores from adsorbing smoke components. In particular, the additive particles carried on the external surface of the adsorbent material have a diameter greater than 20 nm.

The additive particles act as a source of the additive. In some embodiments, the additive is a volatile or semi-volatile compound at room temperature.

In some embodiments, the additive is a chemical species which provides desired properties. In one particular embodiment, the additive provides a desired taste and/or aroma. The presence of additive particles on the surface of the porous carrier material may thus provide the adsorbent material with one or more desired properties.

Alternatively or in addition, where the adsorbent material is incorporated into filter material, the additive particles on the surface of the porous carrier material may provide the filter material with one or more desired properties. As the additive is released from the particles, the additive may be released into the filter material.

Alternatively or in addition, where the adsorbent material is incorporated into a filter element, the additive particles on the surface of the porous carrier material may provide the filter element with one or more desired properties. As the additive is released from the particles, the additive may be released into the filter element.

Alternatively or in addition, where the adsorbent material is incorporated into a smoking article, the additive particles on the surface of the porous carrier material may provide the smoking article with one or more desired properties. As the additive is released from the particles, the additive may be released into the smoking article.

In embodiments wherein one or more additives transform into a gas or vapour in order to serve their purpose, which may be flavouring tobacco smoke in a cigarette for example, the additive or additives may undergo transformation at a steady rate and/or may undergo transformation more rapidly in response to a trigger, which may be an increase in temperature for example.

In embodiments wherein one or more additives undergo transformation at a steady rate, the adsorbent material, such as activated carbon, may be incorporated into a smoking article to result in the smoking article having a steady aroma and/or flavour. In embodiments wherein one or more additives undergo transformation more rapidly in response to an increase in temperature, the adsorbent material, such as activated carbon, may be incorporated into a smoking article whose temperature rises during smoking to result in the smoking article having a stronger aroma and/or flavour once the user has started smoking.

In embodiments wherein the particles comprise one or more additives for release into the vapour phase, one or more of these additives may act as flavourants and/or aromas. As used herein, the terms "flavour" and "flavourant" refer to materials which, where local regulations permit, may be used to create a desired taste or aroma in a product for adult consumers. They may include extracts (e.g., licorice, hydrangea, Japanese white bark magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamon, celery, cascarilla, nutmeg, sandalwood, coconut oil, bergamot, geranium, honey essence, rose oil, vanilla, lemon oil, orange oil, cassia, caraway, cognac, jasmine, ylang-ylang, sage, fennel, pigment, ginger, anise, coriander, coffee, or a mint oil from any species of the genus *Mentha*), flavour enhancers, bitterness receptor site blockers, sensorial receptor site activators or simulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, or powder.

In embodiments wherein one or more additives of the particles act as flavourants and/or aromas, it may be advantageous for these additives to have some volatility because this will promote their transformation into the vapour phase during smoking, and it may be advantageous for them to have strong organoleptic properties in small quantities because this may allow them to impart a detectable organoleptic effect, such as aroma or smell, over an extended period of time.

In some embodiments, the particles on the external surface of the adsorbent material comprise one or more additives wherein one or more of these are any suitable plant compound or derivative thereof. Suitable plant compounds and derivatives thereof include, but are not limited to: sandalwood, eucalyptus, anise, cedar, and any suitable derivatives thereof. Advantageously, all of these examples are volatile and impart strong aromas in small quantities.

In some embodiments, the particles on the external surface of the adsorbent material comprise eucalyptus, or derivatives thereof. In some embodiments, the particles on the external surface of the adsorbent material comprise eucalyptus, wherein the porous carrier material is activated carbon. In some embodiments, the particles on the external surface of the adsorbent material comprise eucalyptus, wherein the porous carrier material is activated carbon, and the adsorbent material is incorporated into a smoking article, such as a cigarette. It may be advantageous to include eucalyptus on the surface of an activated carbon inside a smoking article because eucalyptus has a very strong odour and high volatility. This allows eucalyptus to have a significant effect on the organoleptic properties of the smoke generated during smoking, even when included in small amounts.

In some embodiments, the additive is a diluent. Diluents may, for example, be additives used in smoking articles and they are compounds that vapourise and transfer to the mainstream smoke in aerosol form. They are generally selected such that they transfer to the smoke substantially intact. Other components of the smoke (tobacco-derived components in the case of tobacco-containing smoking articles, or nicotine and/or flavour components in the case of non-tobacco-containing smoking articles) are therefore "diluted" by this means. In some embodiments, the diluent is at least one aerosol forming agent which may be, for instance, a polyol aerosol generator or a non-polyol aerosol generator, preferably a non-polyol aerosol generator. It may be a solid or liquid at room temperature. Suitable polyols include sorbitol, glycerol, and glycols like propylene glycol or triethylene glycol. Suitable non-polyols include monohydric alcohols, high boiling point hydrocarbons, acids such as lactic acid, and esters such as diacetin, triacetin, triethyl citrate or isopropyl myristate. A combination of diluents may be used, in equal or differing proportions. In some embodiments, triacetin, triethyl citrate and isopropyl myristate may be preferred.

In some embodiments, in addition to the adsorbent material including additive particles having a diameter greater than 20 nm carried on the external surfaces of the porous carrier material, smaller particles which may also comprise an additive material, may be included and some of these smaller particles may be located within the pores of the porous carrier. In some embodiments, this is because the source of the particles applied to the external surface may comprise material of the same composition as the particles in a size sufficiently small to occupy the pores of the adsorbent material with a diameter less than 20 nm.

In some embodiments, the additive present in the pores of the porous carrier material is the same as the additive in the additive particles which have a diameter greater than 20 nm and are located on the external surface of the porous carrier material. Alternatively or in addition, the additive in the pores may be different.

In some embodiments, the fraction of the pores occupied by smaller particles, such as those comprising an additive may be less than or equal to about 90%, 80%, 70%, 60%, 50%, 40%, 30%, 20%, 10%, 5%, 1%, or 0.1%.

Since carrying additive particles on the external surface of the porous carrier material will reduce the adsorbent capacity of the porous carrier and therefore of the adsorbent material, it may be desirable to compensate for this by, for example, using more porous carrier material and/or adsorbent material, or by increasing or adjusting the porosity and/or surface area of the porous carrier material to enhance adsorption.

The additive particles on the external surface of the porous carrier material may have any suitable shape, provided their size and shape means that they do not fit in a pore having a diameter of no more than 20 nm. In some embodiments, the diameter of the additive particles may lie within the range of about 20-2000, 20-1500, 20-1000, 20-500, 20-100, or 20-50 nm.

The particles on the external surface of the porous adsorbent material may cover any suitable fraction of the external surface. In some embodiments, it may be advantageous to select the coverage to provide the desired level of both delivery of the additive and adsorption. A greater coverage is likely to result in the delivery of more additive. A lower coverage, however, may in some cases improve adsorption by minimising the obstruction of pores by the particles on the external surface. In some embodiments, the additive particles may cover at least about 10%, 20%, 30%, 40%, 50%, 60%, 70%, 80%, 90%, 99%, or 99.9% of the external surface of the porous carrier material.

The adsorbent material of the invention, with its ability to act as the source of an additive and as an adsorbent, may be useful in a range of different applications. In some embodiments, for example, the adsorbent material may be incorporated into a smoking article or smoking article filter element for both effectively adsorbing molecules from tobacco smoke and effectively delivering a flavour and/or aroma.

In embodiments wherein the adsorbent material is for use in a smoking article, the porous carrier and the additive particles may be chosen in order to provide the adsorbent material with particular smoke-modifying properties. For example, in some embodiments, the additive in the additive particles may be derived from sandalwood, anise, cedar, and/or eucalyptus, so that the adsorbent material may deliver these flavours to tobacco smoke. In addition, in some embodiments, the porous carrier material is selected to effectively and/or selectively adsorb certain constituents from the tobacco smoke.

Filter elements and/or filters according to the second aspect of the present invention comprise the filter material and adsorbent material according to the first aspect of the invention. These filter elements and filters may be incorporated into smoking articles.

Thus, the filter elements and filters in accordance with the invention may comprise filter material, such as cellulose acetate tow, and adsorbent material according to the present invention. In some embodiments, the adsorbent material may be provided in a chamber or it may be dispersed within the filter material. In other embodiments, the adsorbent material may be provided in a patch or layer applied to the inner surface of the wrapper surrounding the filter material to form a filter element.

It is possible to make filters and filter elements from filter material and with an adsorbent material as described herein using conventional processes, techniques and apparatus.

Smoking articles according to the third aspect of the present invention comprise adsorbent material according to the first embodiment.

Figure 2:
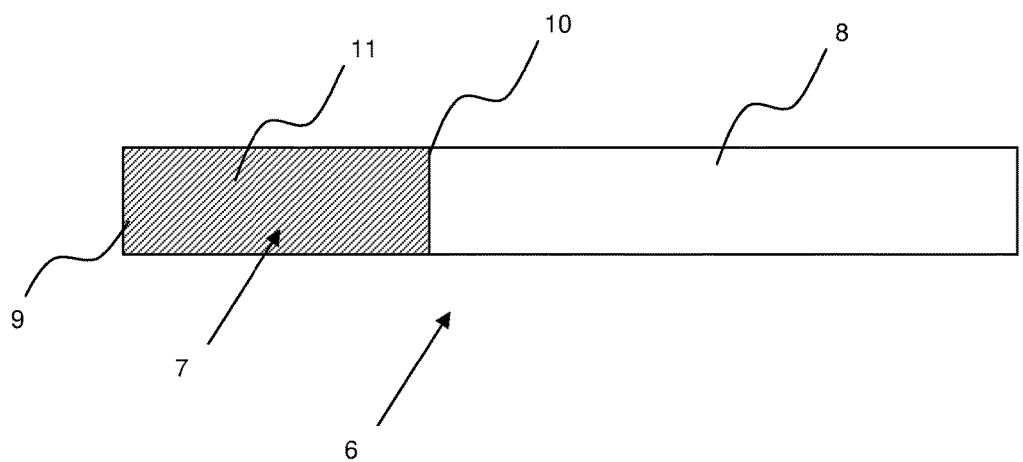
FIG. 2 is a schematic side view of a smoking article including a filter according to some embodiments of the invention.

Referring to FIG. 2, for purpose of illustration and not limitation, a smoking article 6 according to an exemplary embodiment of the invention comprises a filter 7 and a cylindrical rod of smokeable material 8, such as tobacco, aligned with the filter 7 such that one end of the smokeable material rod 8 abuts the end of the filter 7. The filter 7 is wrapped in a plug wrap (not shown) and the smokeable material rod 8 is joined to the filter 7 by tipping paper (not shown) in a conventional manner. The filter 7 is substantially cylindrical and has a mouth end 9 and a smokeable material end 10. The filter 7 comprises a plug of filter material 11. Dispersed within the filter material are particles of absorbent material (not shown) according to the present invention.

The plug of filter material preferably has a size and shape suitable to match the size and shape of the rod of smokeable material to which it may be attached in a finished smoking article.

Although the illustrated smoking article 6 includes a filter 7 having a single filter element or segment comprising an adsorbent material as described herein, other arrangements are possible. For instance, the filter 7 can comprise multiple segments, such as 2, 3 or more segments, with some or all of the segments comprising adsorbent material according to the invention. In some embodiments, the adsorbent material according to the invention may be incorporated into a smoking article in a section separate from the filter of the smoking article.

Figure 3:
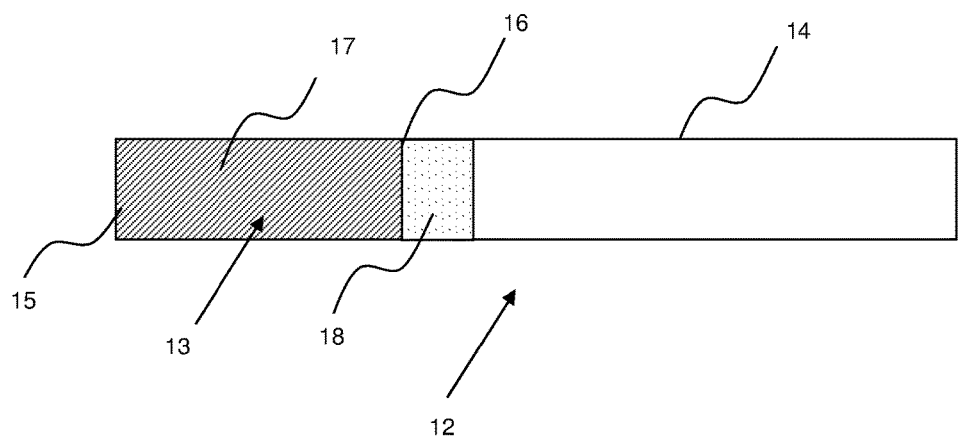
FIG. 3 is a schematic cross-section of a smoking article including the adsorbent material of the invention according to some embodiments of the invention.

Referring to FIG. 3, for the purpose of illustration and not limitation, a smoking article 12 according to an exemplary embodiment of the invention comprises a filter 13 aligned and abutted to a section 18, aligned and abutted to a cylindrical rod of smokeable material 14, such as tobacco. The filter 13 is wrapped in a plug wrap (not shown) and the smokeable material rod 14 is joined to section 18 and the filter 13 by tipping paper (not shown) in a conventional manner. The filter 13 is substantially cylindrical and has a mouth end 15 and a smokeable material end 16. The filter 13 comprises a plug of filter material 17. Section 18 comprises particles of the adsorbent material (not shown) according to the present invention.

Many different filter arrangements for smoking articles are contemplated, including composite filters wherein the filter comprises a plurality of separate filter elements or sections with different filtering capacities, and/or comprising different materials, such as different filter materials and additives, such as adsorbents and flavourants. As used herein, the term "flavourant" refers to materials which, where local regulations permit, may be used to create a desired taste or aroma in a product.

According to a fourth aspect, the present invention relates to a method of preparing the adsorbent material of the invention.

In particular, the present invention relates to a method of preparing an adsorbent material, wherein a porous carrier material is provided comprising pores with a diameter less than 20 nm and additive particles are deposited on the external surface of the porous carrier material, wherein the additive particles have a diameter greater than 20 nm and comprise an additive.

In the method of the invention, the additive particles may be deposited on the external surface of the porous carrier material in any suitable way and from any suitable phase. Furthermore, the particles may be deposited in one or more steps and, in some embodiments, it may be advantageous to deposit the particles in multiple steps as this is likely to increase the fraction of the external surface of the porous carrier material covered by the additive particles.

In some embodiments, the additive particles may be deposited from the solid phase and/or liquid phase of an aerosol.

In some embodiments, two or more different types of particles are deposited onto the external surface of the adsorbent material. The different types of particle may be deposited simultaneously and/or sequentially.

In some embodiments, the particles are deposited onto the external surface of the porous adsorbent material from the solid and/or liquid phase of an aerosol and deposition may take place inside a chamber. The container may be closed or open to the surroundings, and may be closed or open throughout the deposition process or just a part thereof. "Closed" in this context means that the chamber exchanges aerosol with the surroundings at a sufficiently low rate to be considered negligible; "open" in this context means that the chamber exchanges aerosol with the surroundings at a sufficiently high rate to be considered significant.

In some embodiments, the chamber may be closed when the additive particles in the liquid and/or solid phase of the aerosol are deposited onto the porous carrier material. This may promote particle deposition onto the external surface of the adsorbent material.

In embodiments wherein deposition takes place inside a chamber, any suitable chamber may be used. In some embodiments, a suitable chamber includes walls that are substantially impermeable to the additive particle-containing aerosol.

In some embodiments, the method of the invention may include the adjustment or control of any suitable physical conditions, such as temperature and pressure. In some embodiments, the physical conditions may be held constant or may be varied during the method. The optimal set of physical conditions will depend on the porous carrier to which the additive particles are being applied, the additive particles, and the properties desired of the adsorbent material which results following the application of additive particles.

The use of different physical conditions is likely to result in the preparation of an adsorbent material with different quantities of additive particles on the external surface of the porous carrier material and different filtration characteristics. In some embodiments, therefore, certain physical conditions may be controlled in order to prepare an adsorbent material with predetermined quantities of additive particles on the external surface of the porous carrier material and certain filtration characteristics.

Any suitable temperature may be used in the method of the invention, and the temperature may be held constant or may be varied. In some embodiments, the temperature is ambient temperature throughout the method. In other embodiments, the temperature may be higher or lower than ambient temperature throughout, or for part of, the method.

In some embodiments, an adjusted or controlled temperature may be chosen for the purpose of promoting particle deposition onto the external surface of the porous carrier material.

Any suitable pressure may be used in the method of the invention, and the pressure may be held constant or may be varied. In some embodiments, the pressure is equal to atmospheric pressure throughout the method. In other embodiments, the pressure may be higher or lower than atmospheric pressure throughout, or for part of, the method.

The porous carrier material may be exposed to an aerosol comprising the additive particles for deposition for any suitable length of time in the method. The most appropriate length of time is likely to depend on the nature of the porous carrier material, the desired properties of the resulting adsorbent material, and the nature of the other conditions used in the method.

In some embodiments, it may be advantageous to deposit the additive particles over a longer period of time to maximise the fraction of the external surface of the porous carrier material they cover. In some embodiments, this will result in the formation of an adsorbent material which has more flavourants on its external surface and is capable of delivering a stronger flavour and/or aroma. In some embodiments, it may be advantageous to deposit the particles over a shorter period of time to reduce the energy and monetary cost of the method.

In some embodiments, the porous carrier material may be exposed to the aerosol for a period of time sufficient for the system to reach thermodynamic equilibrium, such that the extent of deposition would not change if the system were left for longer. This may advantageously maximise the extent to which the additive particles undergo deposition onto the external surface of the porous carrier material.

In some embodiments, the porous carrier material may be exposed to the aerosol for a period of time insufficient for the system to reach thermodynamic equilibrium, such that the extent of deposition would change if the system were left for longer. This may advantageously make it possible to control the extent to which the additive particles undergo deposition by changing the duration of exposure rather than changing the physical conditions.

In some embodiments, the method of preparing the adsorbent material of the invention may comprise the deposition of particles comprising eucalyptus onto the surface of microporous activated carbon.

Experimental Work

Experiments were carried out to investigate the extent to which porous materials can retain their ability to adsorb compounds having been exposed to an aerosol, using tobacco smoke as an example. Experiments showed that porous materials can be exposed to tobacco smoke multiple times and still retain ability to adsorb compounds effectively.

Particulate micro/meso/macroporous activated carbon was the porous material tested in the experiments. The activated carbon was supplied by Blucher GmbH.

Some properties of the activated carbon are shown in Table 1.

TABLE 1

| Particulate Porous Material | Activated Carbon |
|---|---|
| Particle Shape | Spherical |
| Mean Particle Diameter (mm) | 0.40 |
| Density (g cm$^{-3}$) | 0.37 |
| *Surface Area (m$^2$ g$^{-1}$) | 1660 |
| *Total Pore Volume (cm$^3$ g$^{-1}$) | 0.94 |
| Specific Surface Chemistry/Impregnants | None |

*Measured by nitrogen adsorption at 77 K.

Two weights of the activated carbon were tested: 60 mg and 150 mg.

All cigarettes used in the method were unventilated Virginia KS cigarettes that had been stored for a minimum of 48 hours at 22° C. and 60% relative humidity prior to smoking. All were smoked under the ISO smoking regime (i.e. one 35 ml puff of 2 s duration taken every minute).

A predetermined weight of activated carbon was placed into the recess filter of a cigarette. The cigarette was smoked. The same carbon was all immediately transferred to another, unused cigarette. This cigarette was immediately smoked.

This was repeated multiple times. The same batch of material was therefore used to filter tobacco smoke in multiple cigarettes in quick succession.

Data was collected in real time as each cigarette was being smoked and after each cigarette had been smoked. The collected data was used to investigate the extent to which particular compounds are adsorbed by activated carbon.

The filtered smoke chemistry was analysed by taking the mean of two replicates using Time Of Flight Mass Spectrometry (TOF-MS) and the mean of three replicates using High Performance Liquid Chromatography (HPLC). TOF-MS was used to measure the concentration of acetaldehyde, 1,3-butadiene, acetone, isoprene, MEK, benzene, and toluene in real time. HPLC was used to measure the concentration of acetalydehyde, acetone, acrolein, butyraldehyde, crotonaldehyde, formaldehyde, MEK, and propionaldehyde.

The percentage reduction of each individual smoke component was then calculated as a function of cigarette use.

Figure 4:
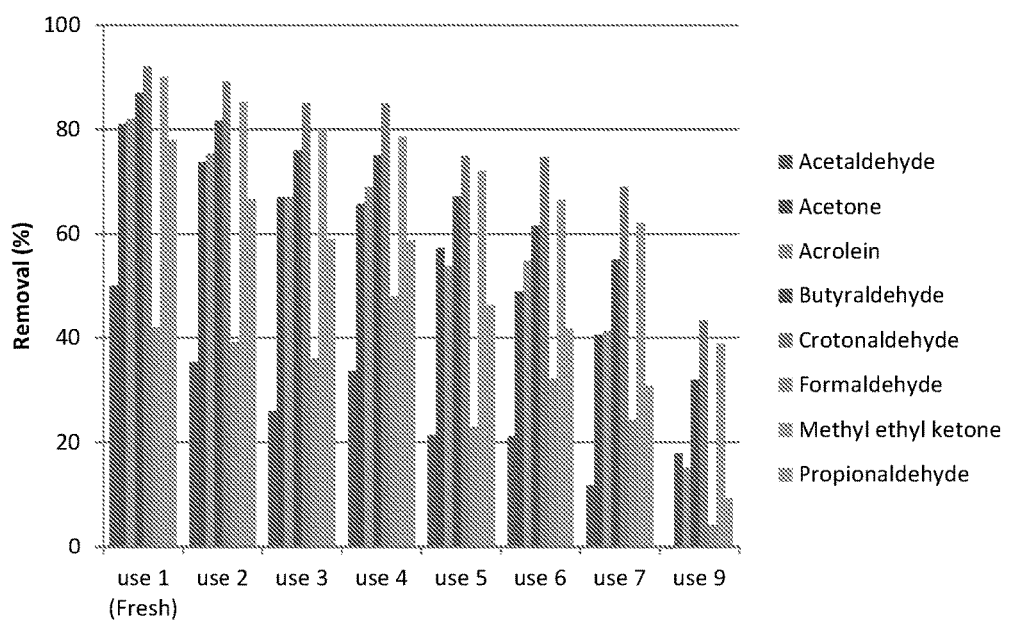
FIG. 4 is a graph showing how the extent to which certain compounds are adsorbed by activated carbon depends on the extent to which the activated carbon has been exposed to tobacco smoke aerosol.

FIG. 4 shows the graph prepared from the data collected using HPLC and the 60 mg activated carbon sample.

Figure 5:
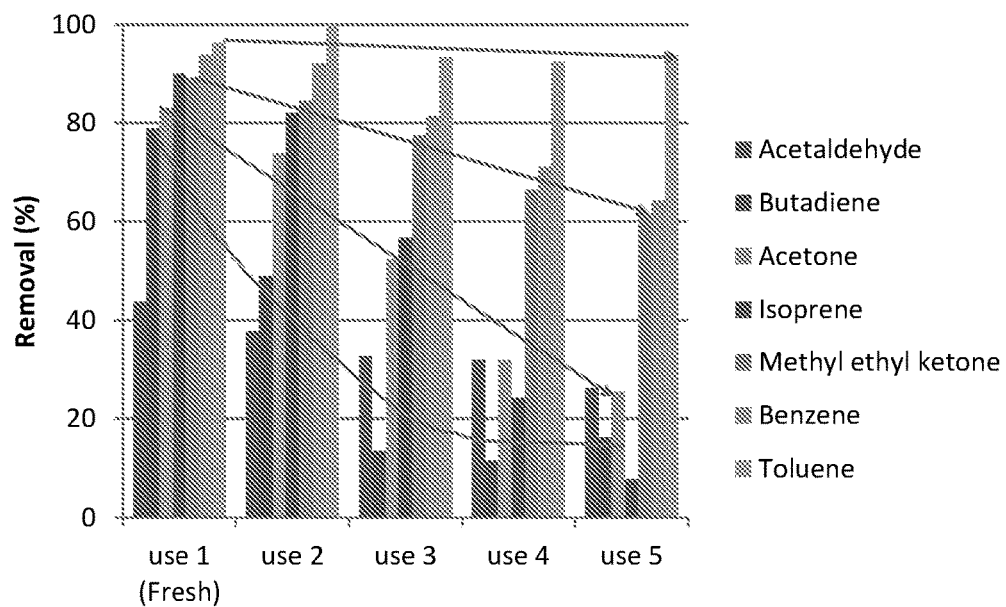
FIG. 5 is a graph showing how the extent to which certain compounds are adsorbed by activated carbon depends on the extent to which the activated carbon has been exposed to tobacco smoke aerosol.

FIG. 5 shows the graph prepared from the data collected using TOF-MS and the 60 mg activated carbon sample.

Figure 6:
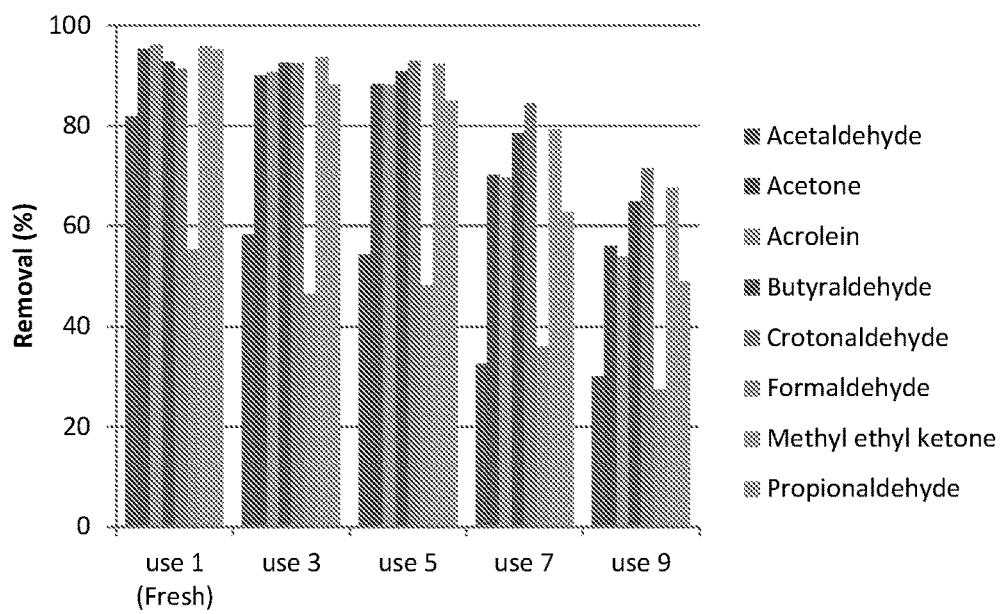
FIG. 6 is a graph showing how the extent to which certain compounds are adsorbed by activated carbon depends on the extent to which the activated carbon has been exposed to tobacco smoke aerosol.

FIG. 6 shows the graph prepared from the data collected using HPLC and the 150 mg activated carbon sample.

Figure 7:
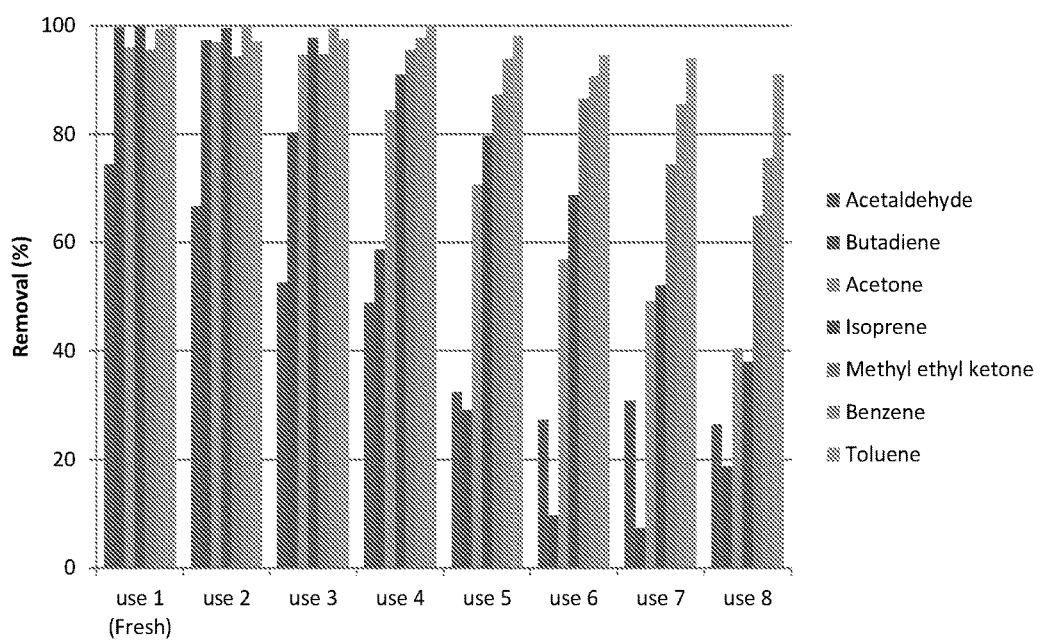
FIG. 7 is a graph showing how the extent to which certain compounds are adsorbed by activated carbon depends on the extent to which the activated carbon has been exposed to tobacco smoke aerosol.

FIG. 7 shows the graph prepared from the data collected using TOF-MS and the 150 mg activated carbon sample.

All of the graphs show that as the number of cigarettes smoked increases, the extent to which activated carbon removes compounds decreases. Thus, the extent to which activated carbon removes compounds depends on the weight of the activated carbon, the compound being adsorbed, and the number of times the cigarette has already been used.

The graphs also show that the activated carbon retains its ability to adsorb compounds effectively after being used in 9 cigarettes. This indicates that activated carbon can be exposed to aerosol multiple times without its pores being blocked due to the deposition of particulate matter.

It was also found that the odour from the compounds deposited onto the activated carbon strengthened with the number of cigarettes smoked. The detection of odour indicates that the organoleptic properties of activated carbon can be modified by depositing particles from an aerosol.

CONCLUSIONS

The following conclusions could be made from the experimental work:
1) Activated carbon can be exposed to tobacco smoke (i.e. solid-phase aerosol) multiple times and still retain its ability to effectively adsorb many different compounds.
2) The extent to which an adsorbent material retains its ability to adsorb a compound depends on the compound being adsorbed. There is a trend: the more volatile the compound, the greater the extent to which the adsorbent material loses its ability to adsorb the compound.
3) Activated carbon has a strong odour after being exposed to tobacco smoke (i.e. solid-phase aerosol). The strength of the odour increases with the number of cigarettes used.

In order to address various issues and advance the art, the entirety of this disclosure shows by way of illustration various embodiments in which the claimed invention may be practiced and provide for superior filtration media. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilised and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in future.

The invention claimed is:

1. An adsorbent material comprising a porous carrier material having pores with a diameter less than 20 nm and carrying additive particles on its external surface, wherein the additive particles comprise an additive and have a diameter of greater than 20 nm, and wherein the additive particles do not occupy the pores of the porous carrier material.

2. An adsorbent material according to claim 1, wherein the additive particles cover at least about 10% of the external surface of the porous carrier material.

3. An adsorbent material according to claim 1, wherein the porous carrier material comprises an activated carbon, silica, zeolite, sepiolite and/or a clay material.

4. An adsorbent material according to claim 1, wherein at least about 10% of the pores of the porous carrier material are available for adsorbing compounds from the vapour phase.

5. An adsorbent material according to claim 1, wherein the additive is a volatile material.

6. An adsorbent material according to claim 1, wherein the additive is a flavour and/or aroma.

7. An adsorbent material according to claim 6, wherein the flavour and/or aroma is a plant compound or derivative thereof, such as sandalwood, eucalyptus, anise, or cedar.

8. An adsorbent material according to claim 1, wherein the additive particles comprise a material for stabilising and/or storing the additive before the additive is released.

9. A smoking article filter element, wherein the smoking article filter element comprises an adsorbent material according to claim 1.

10. A smoking article comprising an adsorbent material according claim 1.

11. A method of preparing an adsorbent material according to claim 1, the method comprising providing a porous carrier material having pores with a diameter less than 20 nm, and depositing additive particles having a diameter of greater than 20 nm onto the external surface of the porous carrier material.

12. A method according to the claim 11, wherein the additive particles are deposited onto the external surface of the porous carrier material from the solid and/or liquid phase of an aerosol.

13. A method according to claim 11, wherein the additive particles are deposited onto the external surface of the porous carrier material inside a closed chamber.

14. A smoking article comprising a smoking article filter element according to claim 9.

* * * * *